Oct. 4, 1938.  E. B. TISDALE  2,131,990
UTILITY RACK
Filed June 14, 1937
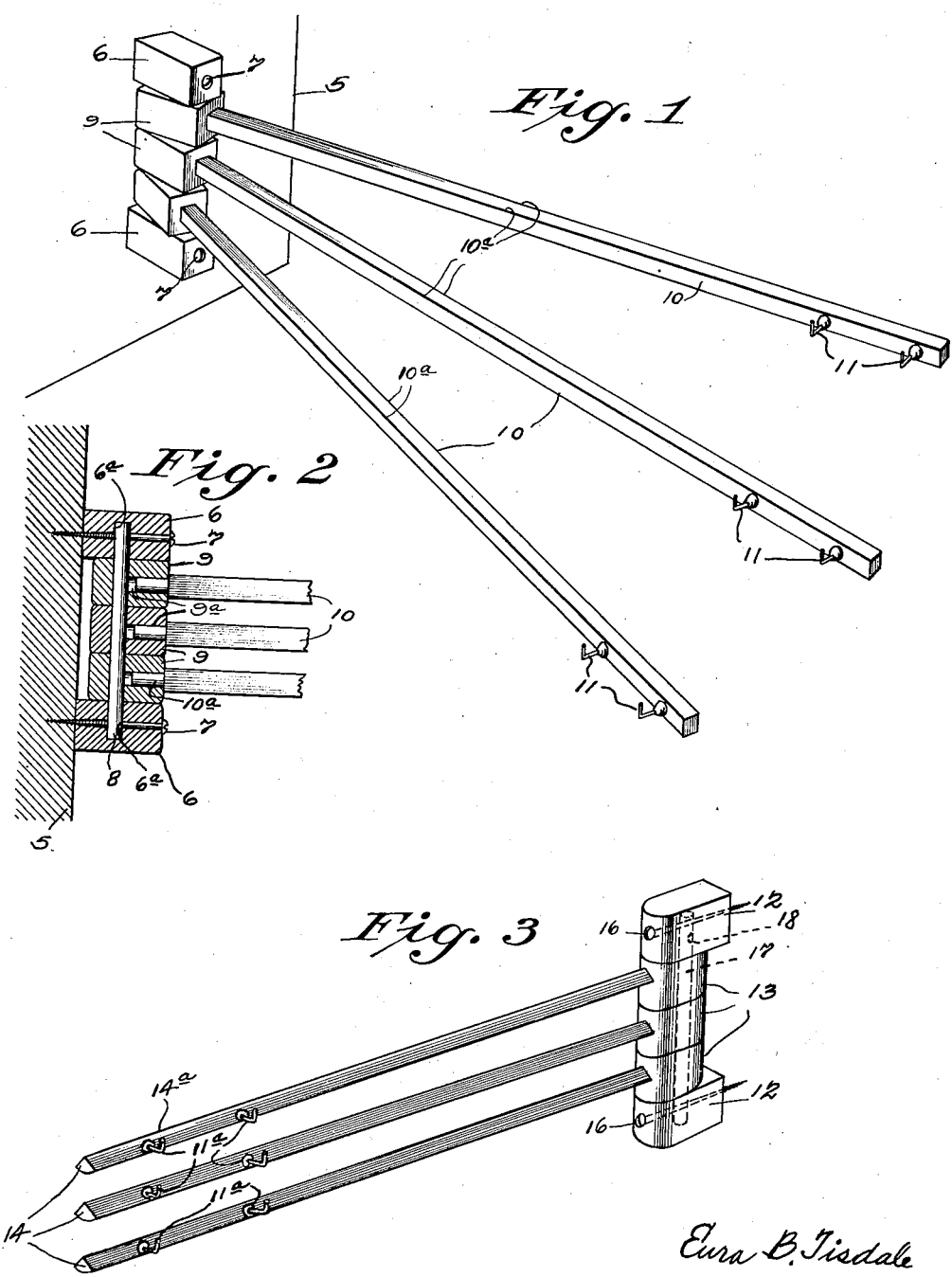

Patented Oct. 4, 1938

2,131,990

UNITED STATES PATENT OFFICE 2,131,990

UTILITY RACK

Eura Barnett Tisdale, Hot Springs, Ark.

Application June 14, 1937, Serial No. 148,176

1 Claim. (Cl. 211—96)

My invention relates to improvements in utility racks for all purposes and has for its primary object to provide a novel and improved device of this character comprehending laterally swingable arms which are so formed and pivoted that they will remain in a relative set position regardless of the length of time that the device has been in use—and this in direct contrast to the utility racks for hanging towels and other articles as disclosed in the prior art. In such prior art devices the swinging arms are susceptible to undesirable shifting, especially after they have been in use for some time and the pivot holes in the ends of the arms become enlarged or the pintle worn very smooth.

A further and more specific object of the invention is to provide a rack as characterized which will be useful in the bathroom as well as the kitchen, on porches or in other rooms or locations in a house and which provides means to prevent towels and other articles from dropping off of the arms.

A still further object of the invention resides in the provision of hook members, or the equivalent, at any desirable points on the arms.

Yet a further object of the invention resides in the provision of a novel pintle support for the laterally and relatively shiftable arm, such pintle support being held in position by the means which mounts the rack upon a wall or other support.

A further object of the invention is to provide either the bearings of the laterally swingable arms or the pintle, or both, of a fibre substance which tends to swell when damp—to the end that such swelling will compensate for wear and will make a tight fit between the bearing portions of the arms and pintles so as to prevent undesired movement of the arms after they have once been set in a relative position.

Invention also resides in certain novel features of construction, combination and arrangement of the various parts, and in modes of operation, all of which will be readily appreciated upon reference to the accompanying drawing in connection with the following descriptive matter.

In the drawing, wherein the same reference characters have been used to designate the same parts in all views, Figure 1 is a perspective view illustrating my utility rack applied to a wall or other support and the laterally swingable arms shifted to a predetermined position—there to remain until manually shifted to another position;

Figure 2 is a vertical sectional view through the end portions of the laterally swingable arms and showing a portion of the support which carries the rack;

Figure 3 is a perspective view illustrating a slightly modified form of the invention.

Referring to the drawing by reference characters, numeral 5 designates a wall or other support to which the rack is secured by means of elongated screws 7 extending through the top and bottom mounting blocks 6.

Figure 2 illustrates that the mounting blocks 6 are elongated as compared to the intermediate block members 9 having the end recesses 9a into which are inserted the doweled ends 10a of the shiftable arms 10.

Figure 2 illustrates clearly that the screws 7 which secure the top and bottom mounting blocks 6 to the support 5 extend through the upper ends of the pivot pin 8, said ends being received in transverse sockets 6a of the mounting block 6. Thus the screws 7 not only clamp the rack to the support 5 but in addition have a twofold function in that firstly they secure the pivot pin 8 in place and prevent it from rotating; and secondly they act further through the pin 8 to frictionally clamp the block ends 9 of the arms 10 in flat face to face contact with one another.

It is further evident from Figure 2 that there is ample clearance between the rear ends of the intermediate arm carrying block members 9 and the support 5 to admit of free swinging of the arms without the block members 9 engaging the support.

By preference, the block members 6, 9 and the pintle 8 will be made out of wood or other fibrous material which has the quality of swelling when damp. This assures of the arms 10 remaining in a set position at all times, although of course they may be readily changed from one position to another by manual operation.

As heretofore intimated an outstanding advantage of my construction is that after the device has been in use for a long time—say a period of years—the arms will still have the quality of remaining in said position as swelling of one or the other or both of the pintles 8 and block 9 will compensate for any wear on the bearing portions of such parts.

Coming now to the particular formation of the extended towel supporting portions of the arms 10, it will be noted that in Figure 1 the same are square in cross section. Thus, the two top edges 10a of the arms provide sharp corners for engaging the towel, wash cloth, dishrag or the like to hold same from slipping transversely off.

Furthermore the arms, as herein shown, are provided with one or more hooks upon which may be suspended a wide variety of articles. Such hooks 11, when the towel or like article is located inwardly thereof will, obviously, prevent endwise shifting of said article relatively of the arms 10. Also when the towel overlies the hooks 11, the latter will prevent both lineal and transverse shifting, regardless of whether the arms are formed with towel-engaging corners 10a or not.

Figure 3 illustrates a modified form of the invention wherein the end or mounting blocks are designated as at 12 and the intermediate or arm carrying blocks as at 13. Said intermediate blocks 13 carry arms 14 which are substantially triangular in cross section. This latter formation of the arms 14 has a rather distinct advantage in that—as will be noted—the intermediate sharp ridges 14a of said arms are disposed upwardly to provide, with the edge corners 14b, three sharp ridges engaging the towel or other article which may be suspended upon such arms 14.

Also in the form of invention shown in Figure 3, the outer ends of the mounting blocks 14 are rounded and the intermediate blocks 13 are substantially oval when viewed in plan to improve the appearance of the rack.

From the foregoing description taken in connection with the accompanying drawing it is believed that my advance over the prior art will be readily understood and its advantages appreciated. The arms 14 of the form of invention shown in Figure 3 may be provided with hooks 11a for the same purpose as those indicated at 11 in Figure 1. Furthermore the device of Figure 3 has screws 16 extending endwise through the mounting blocks 12 and such screws secure the pintle 17 in place in the recesses 18 of said blocks 12. As before the intermediate blocks 13 (of Fig. 3) will preferably be of fibrous material such as wood and the pintle 16 will preferably be of wood also. However, of course, one or the other of the pintle 17 and blocks 13 may be made of other material if desired. The arms 10 of Figure 1 may be of any material but preferably of wood and the same applies to the arms 14 of the device of Figure 3.

While I have illustrated herein the preferred embodiment of my invention, yet it will be understood that various changes may be made in same within the spirit and scope of the subject matter claimed hereinafter.

Having thus described my invention, what I claim as new is:

A rack for the purpose specified comprising a plurality of arms having enlarged bearing ends of moisture-induced swellable material, a wooden pintle extending through the bearing ends of said arms with a snug fit, mounting blocks carried by said wooden pintle at each end thereof, means extending through both of said end blocks and wooden pintle for anchoring said rack to a support, and the bearing ends of said set of arms having flat faces in contact with each other.

EURA BARNETT TISDALE.